US011567392B2

(12) United States Patent
Doi et al.

(10) Patent No.: US 11,567,392 B2
(45) Date of Patent: Jan. 31, 2023

(54) IMAGING APPARATUS, IMAGING CONTROL METHOD, INTERCHANGEABLE LENS AND DIAPHRAGM DRIVING METHOD

(71) Applicant: SONY CORPORATION, Tokyo (JP)

(72) Inventors: Nobuhiro Doi, Tokyo (JP); Jun Aoyama, Tokyo (JP); Kazunari Konishi, Tokyo (JP); Shun Kikuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 17/250,720

(22) PCT Filed: Aug. 23, 2019

(86) PCT No.: PCT/JP2019/033117
§ 371 (c)(1),
(2) Date: Feb. 24, 2021

(87) PCT Pub. No.: WO2020/050066
PCT Pub. Date: Mar. 12, 2020

(65) Prior Publication Data
US 2021/0215995 A1    Jul. 15, 2021

(30) Foreign Application Priority Data

Sep. 4, 2018   (JP) .............................. JP2018-165056

(51) Int. Cl.
*G03B 7/095*    (2021.01)
*G03B 17/14*   (2021.01)
(Continued)

(52) U.S. Cl.
CPC ............... *G03B 7/095* (2013.01); *G03B 9/02* (2013.01); *G03B 17/14* (2013.01); *H04N 5/23209* (2013.01)

(58) Field of Classification Search
CPC ........ G03B 7/095; G03B 7/085; G03B 7/006; G03B 9/02; H04N 5/23212; H04N 5/23245; H04N 5/238
See application file for complete search history.

(56) References Cited

U.S. PATENT DOCUMENTS 5,455,685 A    10/1995 Mori
2010/0220989 A1*  9/2010 Hashigami ............. G03B 7/085
                                                      396/257
(Continued)

FOREIGN PATENT DOCUMENTS

CN    101287074 A    10/2008
CN    106254761 A    12/2016
(Continued)

OTHER PUBLICATIONS

International Search Report and Written Opinion of PCT Application No. PCT/JP2019/033117, dated Nov. 26, 2019, 11 pages of ISRWO.

(Continued)

*Primary Examiner* — Christopher E Mahoney
(74) *Attorney, Agent, or Firm* — Chip Law Group

(57) ABSTRACT

Provided is an imaging apparatus including a mode setting unit that sets a diaphragm driving mode out of a plurality of diaphragm driving modes including a first diaphragm driving mode and a second diaphragm driving mode in which diaphragm driving is more limited than in the first diaphragm driving mode, and a diaphragm control unit that controls diaphragm driving in accordance with brightness of an imaging target in a case where the mode setting unit sets the second diaphragm driving mode.

18 Claims, 13 Drawing Sheets

(51) Int. Cl.
*H04N 5/232* (2006.01)
*G03B 9/02* (2021.01)

(56) References Cited

U.S. PATENT DOCUMENTS

| | | | |
|---|---|---|---|
| 2010/0232779 | A1 | 9/2010 | Okamoto et al. |
| 2012/0194689 | A1* | 8/2012 | Kodama ................ H04N 5/243 |
| | | | 348/E5.045 |
| 2017/0212408 | A1* | 7/2017 | Ma ..................... H04N 5/23296 |
| 2018/0063413 | A1 | 3/2018 | Yoshino |
| 2019/0204535 | A1* | 7/2019 | Yoshino ................ G03B 13/36 |

FOREIGN PATENT DOCUMENTS

| | | |
|---|---|---|
| CN | 106254787 A | 12/2016 |
| JP | 05-219431 A | 8/1993 |
| JP | 2000-66266 A | 3/2000 |
| JP | 2000-066266 A | 3/2000 |
| JP | 2008-96796 A | 4/2008 |
| JP | 2010-273325 A | 12/2010 |
| JP | 2012-23527 A | 2/2012 |
| JP | 2012-215802 A | 11/2012 |
| JP | 2013-130617 A | 7/2013 |
| JP | 2013-148614 A | 8/2013 |
| JP | 2018-31907 A | 3/2018 |
| WO | 2014/133152 A1 | 9/2014 |

OTHER PUBLICATIONS

Office Action for CN Patent Application No. 201980056063.X, dated Apr. 1, 2022, 14 pages of English Translation and 9 pages of Office Action.

\* cited by examiner

IMAGING APPARATUS, IMAGING CONTROL METHOD, INTERCHANGEABLE LENS AND DIAPHRAGM DRIVING METHOD

CROSS REFERENCE TO RELATED APPLICATIONS

This application is a U.S. National Phase of International Patent Application No. PCT/JP2019/033117 filed on Aug. 23, 2019, which claims priority benefit of Japanese Patent Application No. JP 2018-165056 filed in the Japan Patent Office on Sep. 4, 2018. Each of the above-referenced applications is hereby incorporated herein by reference in its entirety.

TECHNICAL FIELD

The present disclosure relates to an imaging apparatus, an imaging control method, an interchangeable lens and a diaphragm driving method.

BACKGROUND ART

In recent years, imaging apparatuses that acquire an image of a subject by imaging processing are widely used. In the imaging processing, a driving sound is generated due to lens driving, diaphragm driving and the like. However, generation of the driving sound is not desirable in some scenes, hence research to reduce the driving sound is ongoing.

For example, PTL 1 and PTL 2 disclose imaging apparatuses that can reduce the driving sound. Specifically, PTL 1 discloses an imaging apparatus that controls the driving speed of a focusing lens in accordance with the air temperature. PTL 2 discloses an imaging apparatus that controls the driving speed of a focusing lens in order to reduce the driving sound of the focusing lens.

CITATION LIST

Patent Literature

[PTL 1]
JP 2012-215802 A
[PTL 2]
WO 2014/133152

SUMMARY

Technical Problem

An example of a sound generated in the imaging apparatus, other than the driving sound of the focusing lens referred to in PTL 2, is the driving sound of a diaphragm mechanism. However, research and development focusing on the reduction of driving sound of the diaphragm mechanism have not been sufficiently performed.

With the foregoing in view, the present disclosure provides a new and improved imaging apparatus, imaging control method, interchangeable lens and diaphragm driving method, which allow to reduce the driving sound of the diaphragm mechanism.

Solution to Problem

The present disclosure provides an imaging apparatus including: a mode setting unit configured to set one diaphragm driving mode out of a plurality of diaphragm driving modes including a first diaphragm driving mode and a second diaphragm driving mode in which diaphragm driving is more limited than in the first diaphragm driving mode; and a diaphragm control unit configured to control diaphragm driving in accordance with brightness of an imaging target in a case where the mode setting unit sets the second diaphragm driving mode.

Furthermore, the present disclosure provides an imaging control method including steps of: setting one diaphragm driving mode out of a plurality of diaphragm driving modes including a first diaphragm driving mode and a second diaphragm driving mode in which diaphragm driving is more limited than in the first diaphragm driving mode; and controlling diaphragm driving using a processor in accordance with brightness of an imaging target in a case where the second diaphragm driving mode is set.

Furthermore, the present disclosure provides an interchangeable lens including: a diaphragm mechanism; a communication unit to which parameters indicating one diaphragm driving mode, out of a plurality of diaphragm driving modes including a first diaphragm driving mode and a second diaphragm driving mode, and a diaphragm value, are supplied; and a diaphragm driving unit configured to drive the diaphragm mechanism so that an aperture diameter of the diaphragm mechanism becomes an aperture diameter corresponding to the diaphragm value, wherein in the second diaphragm driving mode, the diaphragm driving unit drives the diaphragm mechanism at a lower speed than in the first diaphragm driving mode.

Furthermore, the present disclosure provides a diaphragm driving method using an interchangeable lens, including steps of: supplying parameters indicating one diaphragm driving mode out of a plurality of diaphragm driving modes including a first diaphragm driving mode and a second diaphragm driving mode, and a diaphragm value; and driving the diaphragm mechanism so that an aperture diameter of a diaphragm mechanism becomes an aperture diameter corresponding to the diaphragm value, wherein in the second diaphragm driving mode, driving the diaphragm mechanism includes driving the diaphragm mechanism at lower speed than in the first diaphragm driving mode.

Advantageous Effects of Invention

As disclosed above, according to the present disclosure, the driving sound of the diaphragm mechanism can be reduced. It should be noted that the above mentioned effect is not restrictive, and any effect indicated in the present description or a different effect that may be grasped based on the present description may be implemented along with or instead of the above mentioned effect.

DESCRIPTION OF EMBODIMENTS

Figure 1:
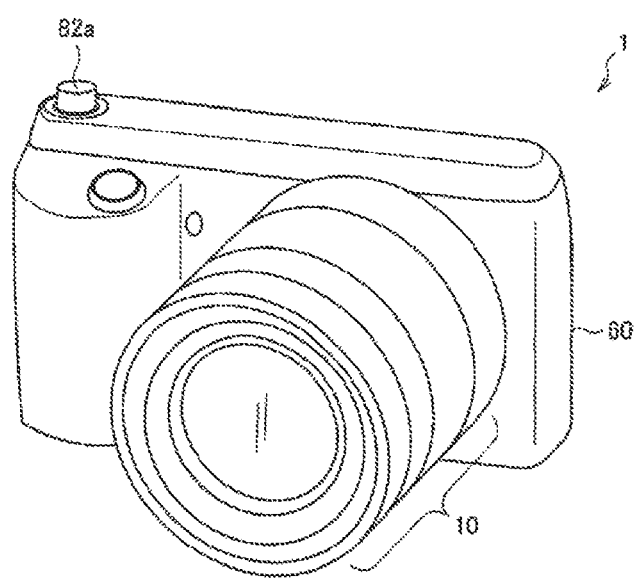
FIG. 1 is an explanatory illustration depicting an external view of a camera system 1 according to an embodiment of the present disclosure.

Embodiments of the present disclosure will now be described with reference to the accompanying drawings. In the present description and drawings, composing elements having substantially a same functional configuration are denoted with a same reference sign, and redundant explanation thereof is omitted.

Further, in the present description and drawings, in some cases, a plurality of composing elements having substantially a same functional configuration may be differentiated by a different alphabetic character attached to a same sign. However, in a case where there is no special need to differentiate each of the plurality of composing elements having the substantially same functional configuration, each of the plurality of composing elements is denoted only with the same reference sign.

The present disclosure will be described according to the following item sequence.

1. Overview of camera system
2. Configuration of camera system
2-1. Configuration of interchangeable lens
2-2. Configuration of imaging apparatus
2-3. Viewpoint
3. Overview of diaphragm driving mode
4. Execution condition of diaphragm driving
5. Transition amount of diaphragm
6. Types of diaphragm driving
7. Driving speed of diaphragm
8. Summary of operation
9. Summary of functional effects
10. Modifications
11. Supplements <1. Overview of Camera System>

FIG. 1 is an explanatory illustration depicting an external view of a camera system 1 according to an embodiment of the present disclosure. As illustrated in FIG. 1, the camera system 1 according to the embodiment of the present disclosure is a lens exchanging type digital camera that includes an interchangeable lens 10 and an imaging apparatus 60.

The interchangeable lens 10 includes: an optical element group for collecting light emitted from a subject and forming a subject image on an image pickup element disposed in the imaging apparatus 60; a driving element group for driving the optical element group; and the like. This interchangeable lens 10 is removably attached to the imaging apparatus 60. The interchangeable lens 10 that is attached to the imaging apparatus 60 is electrically connected to the imaging apparatus 60 via a plurality of terminals, and can drive the optical element group in accordance with an instruction supplied from the imaging apparatus 60.

The imaging apparatus 60 includes an image pickup element and converts a subject image formed on the image pickup element into electric signals using the interchangeable lens 10. For example, when a release button 82a illustrated in FIG. 1 is pressed, the imaging apparatus 60 performs such processing as supplying control signals to the interchangeable lens 10, executing exposure, and converting a subject image into electric signals, and acquires an image for recording.

In the imaging apparatus 60, interchangeable lenses other than the interchangeable lens 10 illustrated in FIG. 1 can be attached. By attaching an interchangeable lens, which is suitable for a subject or an imaging environment, to the imaging apparatus 60, the user can acquire desirable images.

While an example of applying the technique of the present disclosure to the camera system 1 including the interchangeable lens 10 and the imaging apparatus 60 illustrated in FIG. 1 is primarily explained in the present description, the technique of the present disclosure is also applicable to an imaging apparatus in which the functions of the optical element group are integrated.

<2. Configuration of Camera System>

Figure 2:
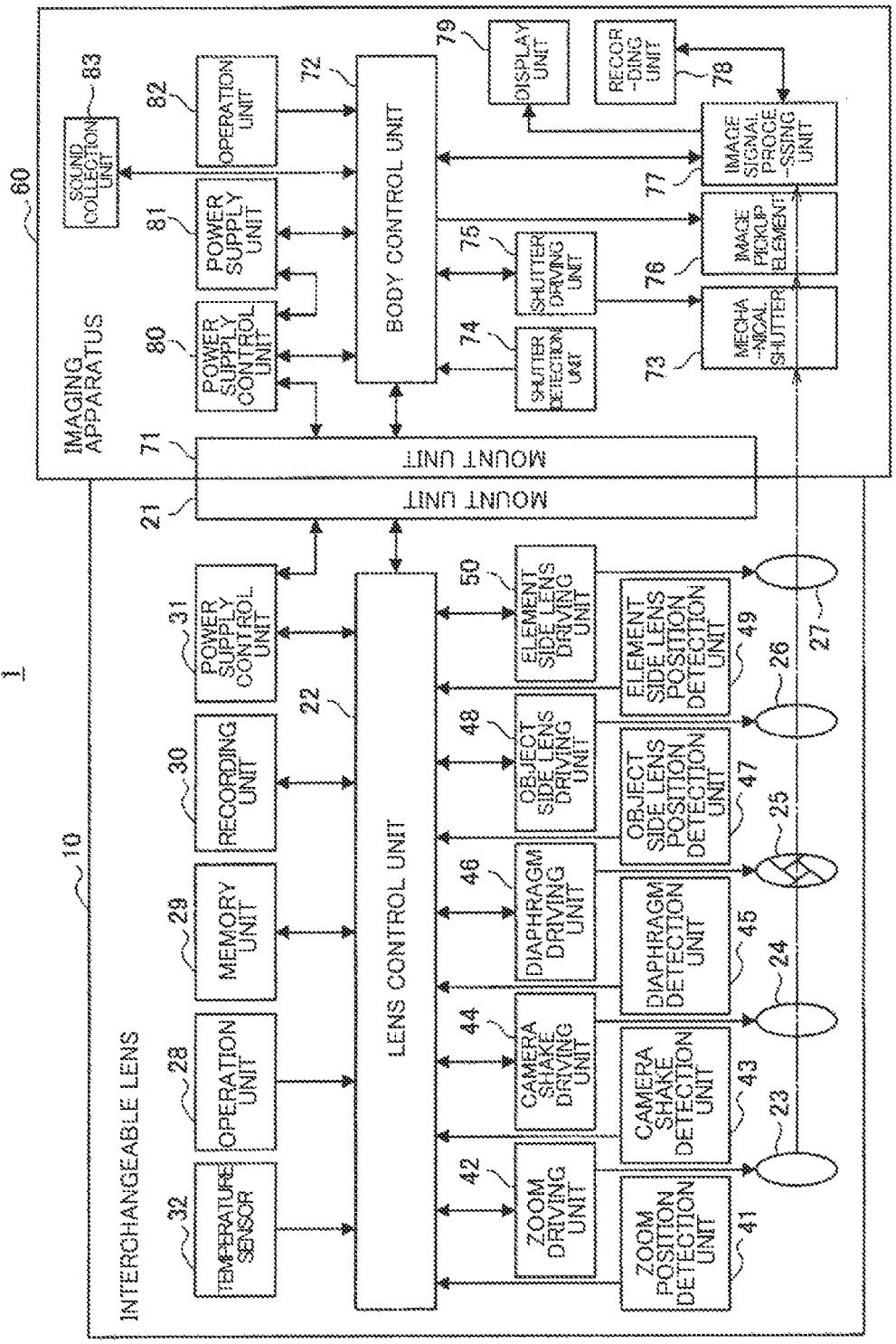
FIG. 2 is an explanatory diagram depicting a configuration of the camera system 1 according to an embodiment of the present disclosure.

An overview of the camera system 1 according to an embodiment of the present disclosure was described. Now configurations of the interchangeable lens 10 and the imaging apparatus 60 included in the camera system 1 according to the embodiment of the present disclosure will be sequentially described in detail with reference to FIG. 2. FIG. 2 is an explanatory diagram depicting a configuration of the camera system 1 according to the embodiment of the present disclosure.

(2-1. Configuration of Interchangeable Lens)

As indicated in FIG. 2, the interchangeable lens 10 includes: a mount unit 21, a lens control unit 22, a zoom lens 23, a camera shake correction lens 24, a diaphragm mechanism 25, an object side focus lens 26, an element side focus lens 27, an operation unit 28, a memory unit 29, a recording unit 30, a power supply control unit 31, a temperature sensor 32, a zoom position detection unit 41, a zoom driving unit 42, a camera shake detection unit 43, a camera shake driving unit 44, a diaphragm detection unit 45, a diaphragm driving unit 46, an object side lens position detection unit 47, an object side lens driving unit 48, an element side lens position detection unit 49 and an element side lens driving unit 50.

The mount unit 21 is removably attached to a mount unit 71 of the imaging apparatus 60. The mount unit 21 includes a plurality of terminals (not illustrated) that are electrically connected with the mount unit 71 of the imaging apparatus 60.

The lens control unit 22 is constituted of an arithmetic processing unit, such as a central processing unit (CPU) and a micro processing unit (MPU), peripheral circuits, and the like, for example, and controls the interchangeable lens 10 in general by reading and executing predetermined control programs recorded in the recording unit 30.

For example, the lens control unit 22 controls the position of the zoom lens 23 in accordance with an instruction from the imaging apparatus 60, which is supplied via a predetermined communication terminal of the mount unit 21, or in accordance with an operation by the user received by the operation unit 28. More specifically, the lens control unit 22 acquires the current position of the zoom lens 23 from the zoom position detection unit 41, determines a driving direction and a driving amount to move the zoom lens 23 to a predetermined position based on the acquired result, and outputs the determined driving direction and driving amount to the zoom driving unit 42, along with a moving instruction. The zoom position detection unit 41 is constituted of a magnetic sensor (MR), for example, detects the position of the zoom lens 23, and supplies the detected position to the lens control unit 22. Based on the moving instruction supplied from the lens control unit 22, the zoom driving unit 42 moves the zoom lens 23 in the optical axis direction, so that the instructed driving direction and driving amount are implemented.

The lens control unit 22 also controls the camera shake correction lens 24 so as to correct camera shaking. Specifically, based on a camera shake amount detected by the camera shake detection unit 43, the lens control unit 22 determines the driving direction and the driving amount of the camera shake correction lens 24 in a direction to cancel out the camera shake amount, and outputs the determined driving direction and driving amount to the camera shake driving unit 44 along with the moving instruction. The camera shake detection unit 43 is constituted of a gyro sensor, a three-axis acceleration sensor, and the like. The gyro sensor is used to detect a deviation (camera shake) in a direction corresponding to pitch or yaw which is the correction direction of the camera shake correction lens 24, and the three-axis acceleration sensor is used to detect a deviation (camera shake) in the X axis and Y axis directions when the optical axis direction is the Z axis. The camera shake detection unit 43 may include one or both the gyro sensor and the three-axis acceleration sensor. Based on the moving instruction supplied from the lens control unit 22, the camera shake driving unit 44 moves the camera shake correction lens 24 so that the instructed driving direction and driving amount are implemented.

The lens control unit 22 also controls an aperture diameter of the diaphragm mechanism 25 in accordance with the instruction from the imaging apparatus 60, supplied via a predetermined communication terminal of the mount unit 21, for example. Specifically, the lens control unit 22 acquires the aperture diameter of the diaphragm mechanism 25 detected by the diaphragm detection unit 45, instructs the diaphragm driving unit 46 so as to implement an F value (diaphragm value) instructed by the imaging apparatus 60, and drives the diaphragm mechanism 25. The diaphragm driving unit 46 includes a motor, for example, and drives the diaphragm mechanism 25 so as to implement the aperture diameter instructed by the lens control unit 22. When the diaphragm driving unit 46 drives the diaphragm mechanism 25, a driving sound may be generated.

The lens control unit 22 also controls two types of focus lenses: the object side focus lens 26 and the element side focus lens 27. Specifically, the lens control unit 22 acquires a current position of the object side focus lens 26 from the object side lens position detection unit 47, determines a driving direction and a driving amount to move the object side focus lens 26 to a predetermined position based on the acquired result, and outputs the determined driving direction and driving amount to the object side lens driving unit 48 along with a moving instruction. The object side lens driving unit 48 moves the object side focus lens 26 in the optical axis direction so that the instructed driving direction and driving amount are implemented. In the same manner, the lens control unit 22 acquires a current position of the element side focus lens 27 from the element side lens position detection unit 49, determines a driving direction and a driving amount to move the element side focus lens 27 to a predetermined position based on the acquired result, and outputs the determined driving direction and driving amount to the element side lens driving unit 50 along with a moving instruction. The element side lens driving unit 50 moves the element side focus lens 27 in the optical axis direction so that the instructed driving direction and driving amount are implemented.

The object side lens position detection unit 47 and the element side lens position detection unit 49 may be constituted of a magnetic sensor, a photodiode array, a potentiometer, a reflection type encoder, and the like, for example.

For the object side lens driving unit 48 and the element side lens driving unit 50, an ultrasonic motor, a DC motor, a linear actuator, a stepping motor, a piezoelectric element, and the like, can be used, but in the case of driving a focus lens of which lens diameter and lens thickness are large and weight is heavy, a DC motor or an ultrasonic motor is preferable. In the case where the interchangeable lens 10 includes two types of focus lenses: the object side focus lens 26 and the element side focus lens 27, the object side focus lens 26 is normally a heavier lens.

Of the two types of focus lenses, the object side focus lens 26 is a focus lens that is closer to the object lens, and the element side focus lens 27 is a focus lens that is closer to the image pickup element 76 of the imaging apparatus 60. Each focus lens of the object side focus lens 26 and the element side focus lens 27 includes one or a plurality of optical elements.

The interchangeable lens 10 need not include the two types of focus lenses. For example, one of the object side focus lens 26 and the element side focus lens 27 may be omitted. In this case, the position detection unit and the lens driving unit corresponding to the omitted focus lens are also omitted.

The operation unit 28 supports a zoom ring for manually setting zoom magnification, a focusing ring for manually setting a focus lens, and the like, receives the manual operation by the user, and supplies an operation signal corresponding to the received operation to the lens control unit 22.

The memory unit 29 is a volatile storing medium, such as a random access memory (RAM), for example, and is used as a storage region for various data during operation.

The recording unit 30 is a non-volatile storage medium, and the recording unit 30 stores predetermined control programs that are executed by the lens control unit 22, and various data including parameters for adjustment.

The power supply control unit 31 detects the electric energy of the power supply supplied from the imaging apparatus 60, and based on the detected electric energy, the power supply control unit 31 optimally distributes the electric energy and supplies the power to each unit (lens control unit 22 and various driving units) of the interchangeable lens 10.

The temperature sensor 32 detects the peripheral temperature or internal temperature of the interchangeable lens 10, and supplies the detected temperature to the lens control unit 22. The detection result by the temperature sensor 32 is used for determining parameters when temperature change is considered.

(2-2. Configuration of Imaging Apparatus)

As indicated in FIG. 2, the imaging apparatus 60 includes: the mount unit 71, a body control unit 72, a mechanical shutter 73, a shutter detection unit 74, a shutter driving unit 75, an image pickup element 76, an image signal processing unit 77, a recording unit 78, a display unit 79, a power supply control unit 80, a power supply unit 81, an operation unit 82 and a sound collection unit 83.

The mount unit 21 of the interchangeable lens 10 is removably attached to the mount unit 71. The mount unit 71 includes a plurality of terminals that are electrically connected with the mount unit 21 of the interchangeable lens 10. When the mount unit 21 of the interchangeable lens 10 is attached to the mount unit 71, each terminal of the mount unit 71 and corresponding terminal of the mount unit 21 of the interchangeable lens 10 are electrically and physically connected with each other. The terminals that are connected are, for example, terminals to supply power (power supply terminals) terminals to transmit commands and data (communication terminals), and terminals to transmit synchronizing signals (synchronizing signal terminals).

The body control unit 72 is constituted of an arithmetic processing unit, such as a central processing unit (CPU) and a micro processing unit (MPU), a non-volatile memory, peripheral circuits, and the like, for example, and controls the camera system 1 in general by reading and executing predetermined control programs recorded in the internal non-volatile memory.

For example, based on an operation signal which indicates a predetermined operation by the user, supplied from the operation unit 82, the body control unit 72 causes the image pickup element 76 to perform imaging, or transmits a predetermined command to the interchangeable lens 10 via the mount unit 71, and causes the interchangeable lens 10 to drive the focus lenses (object side focus lens 26 and element side focus lens 27), the zoom lens 23, the diaphragm mechanism 25, and the like.

Further, the lens position information of the focus lens, the zoom position information of the zoom lens 23, the aperture diameter information of the diaphragm mechanism 25, and the like are supplied from the interchangeable lens 10 to the body control unit 72 via the mount unit 71. At an optimum timing based on this information, the body control unit 72 causes the image pickup element 76 to capture an image to be recorded in the recording unit 78 or capture an image to be transmitted to an external device. The image acquired by the image pickup element 76 is recorded in the recording unit 78 or displayed on the display unit 79 in accordance with the control by the body control unit 72.

The mechanical shutter 73 is disposed on the front surface of the image pickup element 76, and opens/closes in accordance with the control of the shutter driving unit 75. When the mechanical shutter 73 is in the closed state, the light from the subject passing through the optical system of the interchangeable lens 10 is blocked. The shutter detection unit 74 detects the open/close state of the mechanical shutter 73, and supplies the detected result to the body control unit 72. Based on the control by the body control unit 72, the shutter driving unit 75 drives the mechanical shutter 73 to the open state or the close state.

The image pickup element 76 is constituted of a charge coupled device (CCD), a complementary metal oxide semiconductor (CMOS) sensor, or the like, for example, and images the subject and generates and outputs an image expressed by electric signals.

The image pickup element 76 includes a pixel array unit in which pixels, to generate signals for image generation (imaging pixels) are arrayed in a matrix. Some of the pixels of the pixel array unit are phase difference pixels that generate signals for focal point detection. In each phase difference pixel, a part of the light receiving region is blocked by a light shielding film, and the deviation of focus can be detected using the pixel signals outputted from two phase difference pixels of which light shielded regions, shielded by the light shielding film, are symmetric with respect to the optical axis.

In a case where the image pickup element 76 is constituted of a CCD sensor or a CMOS sensor, an electronic shutter can be used, hence the mechanical shutter 73 may be omitted. In the case of omitting the mechanical shutter 73, the shutter detection unit 74 and the shutter driving unit 75, which are used for the control of the mechanical shutter 73, are also omitted.

The image signal processing unit 77 executes a predetermined image signal processing on an image supplied from the image pickup element 76. For example, the image signal processing unit 77 converts a RAW image supplied from the image pickup element 76 into image data in a predetermined file format, and causes the recording unit 78 to record the converted data. Further, the image signal processing unit 77 executes demosaic processing on the RAW image, then converts the demosaic processed RAW image into image data in a predetermined file format by performing lossless compression or lossy compression, and causes the recording unit 78 to recording the converted data. Furthermore, the image signal processing unit 77 converts the image data supplied from the image pickup element 76 into image signals in a predetermined display format, and supplies the image signals to the display unit 79 so as to display the captured image.

The recording unit 78 is constituted of a non-volatile memory, for example, and records (stores) data of the image captured by the image pickup element 76, and the like. The recording medium used for the recording unit 78 may be removable.

The display unit 79 is constituted of a panel type display device, such as a liquid crystal panel and an organic electro luminescence (EL) panel, and displays an image (moving image or still image) supplied from the image signal processing unit 77. The display unit 79 is installed on the rear surface, which is on the opposite side of the front surface where the mount unit 71 is disposed, and can display a live view image, preview image, and the like.

The power supply control unit 80 supplies power, which is supplied from the power supply unit 81, to each unit of the imaging apparatus 60. The power supply control unit 80 also calculates the electric energy of the power supply that can be supplied to the interchangeable lens 10, with considering the operating state of the imaging apparatus 60, and supplies the power to the interchangeable lens 10 via the mount unit 71. The power supply unit 81 is constituted of such a secondary battery as an NiCd battery, an NiMH battery and an Li battery, an AC adapter, and the like, for example.

The operation unit 82 has a configuration that is operated by the user, and includes a release button 82a illustrated in FIG. 1, for example. In addition to the release button 82a, the operation unit 82 includes hardware keys, such as a mode dial and a zoom button, and software keys via a touch panel layered on the display unit 79, and receives predetermined operations performed by the user, and supplies these operation signals to the body control unit 72. By operating the operation unit 82, the user can perform such an operation as setting an image capturing mode and setting parameters.

The sound collection unit 83 converts sound, which is aerial vibration, into sound signals, which are electric signals. When a moving image is captured, for example, the sound signals acquired by the sound collection unit 83 are recorded in the recording unit 78 along with the moving images.

(2-3. Viewpoint)

There are different types of auto focus, such as contrast auto focus and phase difference auto focus. The phase different auto focus includes auto focus using a dedicated phase difference sensor independently from the image pickup element; and image plane phase difference auto focus using phase difference pixels embedded in the pixels of the image pickup element. In the case of performing such auto focus when a still image is captured, the subject is focused on with high accuracy by driving the diaphragm mechanism to increase the aperture of the diaphragm mechanism. This is because the depth of field becomes shallower and the peak position of the focus can be detected more easily, as the aperture of the diaphragm mechanism is larger. In auto focus, when the diaphragm mechanism is driven like this, a driving sound of the diaphragm mechanism is generated.

The driving sound generated from the camera system is recorded when a moving image is captured, but the driving sound generated from the camera system is not recorded when a still image is captured, hence the driving sound generated from the camera system when a still image is captured tends to be treated lightly.

However, the driving sound generated from a camera system when a still image is captured can influence the environment. For example, in a case where the subject is a creature that is sensitive to sound, the creature may react to the driving sound, and capturing the image of the creature may fail. Further, in specific scenes, capturing still images may be restricted because of the driving sound generated when a still image is captured. The specific scenes are, for example, a silent ceremony at a weeding, concerts and theatres, and sports scenes in which cheering and shouting are not recommended, such as in golf when a golfer is swinging, and in tennis when a serve or rally is ongoing.

With the foregoing in view, the present inventor came to create the embodiment of the present disclosure. According to the embodiment of the present disclosure, the driving sound generated from the camera system can be reduced. In particular, according to the embodiment of the present disclosure, the driving sound of the diaphragm mechanism 25 that is generated due to auto focus when a still image is captured can be reduced. A structure of reducing the driving sound of the diaphragm mechanism 25 will be described next.

<3. Overview of Diaphragm Driving Mode>

The camera system 1 according to the embodiment of the present disclosure can operate in accordance with any diaphragm driving mode out of at least two diaphragm driving modes which are supported by the interchangeable lens 10. At least two diaphragm driving modes include, for example, a performance priority mode and a silence priority mode.

The performance priority mode is an example of a first diaphragm driving mode in which the diaphragm mechanism 25 is driven such that the performance of the camera system 1 is better demonstrated. The silence priority mode is an example of a second diaphragm driving mode in which the diaphragm driving is more limited than in the performance priority mode. Auto focus includes continuous auto focus in which auto focus is performed tracking the subject, and single auto focus in which auto focus is performed once. In single auto focus, for example, the aperture diameter of the diaphragm mechanism 25 is opened to the maximum in the performance priority mode. In the silence priority mode, on the other hand, conditions to limit the execution of diaphragm driving are applied, hence in the silence priority mode, it is difficult to execute the diaphragm driving for the single auto focus. Further, in the silence priority mode, even if the diaphragm driving for single auto focus is executed, the transition amount of the diaphragm is small and the diaphragm driving is performed a low-speed. Moreover, the diaphragm driving type includes vertical synchronous driving and asynchronous driving, and the choice of the diaphragm driving type may be considerably different between the performance priority mode and silence priority mode. Because of these differences between the performance priority mode and silence priority mode, the driving sound of the diaphragm mechanism 25 can be reduced in the silence priority mode. In the following, the single auto focus will primarily be described.

The imaging apparatus 60 according to the embodiment of the present disclosure can set the silence priority mode, out of a plurality of diaphragm driving modes that includes the silence priority mode, in a case where the interchangeable lens 10, attached to the imaging apparatus 60, supports the silence priority mode. The function of the mode setting unit that sets the diaphragm driving mode and the function of the diaphragm control unit that controls the diaphragm driving, in accordance with the diaphragm driving mode which is set, are implemented by the body control unit 72 of the imaging apparatus 60.

The body control unit 72 may set the diaphragm driving mode that the user specified by operating the operation unit 82, for example. By this configuration, the intention of the user can be reflected in the setting of the diaphragm driving mode with higher certainty.

The body control unit 72 may include a function of a scene estimation unit that estimates a scene, and sets the silence priority mode in a case where the estimated scene is a specified scene. For example, the body control unit 72 may estimate whether the current scene is a specified scene or not, using at least one of: an image signal supplied from the image signal processing unit 77, and a sound signal supplied from the sound collection unit 83. Specifically, the body control unit 72 may estimate that the current scene is a specified scene based on whether the magnitude of the sound signal does not exceed a threshold, or image signals are expressing a silent ceremony or a sporting scene in which cheering and shouting are discouraged. According to this configuration, the diaphragm driving mode is automatically set without the user specifying the diaphragm driving mode, hence user friendliness can be improved. Further, in the case where the user specifies an imaging scene, the body control unit 72 may set a diaphragm driving mode in accordance with the specified scene. By this configuration as well, the diaphragm driving mode is automatically set without the user explicitly or directly specifying the diaphragm driving mode, hence user friendliness can be improved.

An overview of the diaphragm driving modes that are used in the embodiment of the present disclosure was described above. As mentioned, the conditions under which the diaphragm driving is executed, the transition amount of the diaphragm, the type of diaphragm driving, the speed of diaphragm driving, and the like are different between the performance priority mode and silence priority mode. The execution condition of the diaphragm driving to be applied to the silence priority mode, the transition amount of the diaphragm in the silence priority mode, the type of the diaphragm driving, and the speed of the diaphragm driving will now be described with specifics.

<4. Execution Condition of Diaphragm Driving>

As the diaphragm value of the diaphragm mechanism 25 increases, the depth of field deepens, and the focusing of auto focus becomes more difficult. Therefore a maximum value of the diaphragm value corresponding to a desired accuracy is set in advance for each brightness of the imaging target, so that auto focus can be executed at the desired accuracy. An example of a line graph depicting a relationship between a maximum value of a diaphragm value with which auto focus can be executed, and brightness of an imaging target will be described with reference to FIG. 3.

Figure 3:
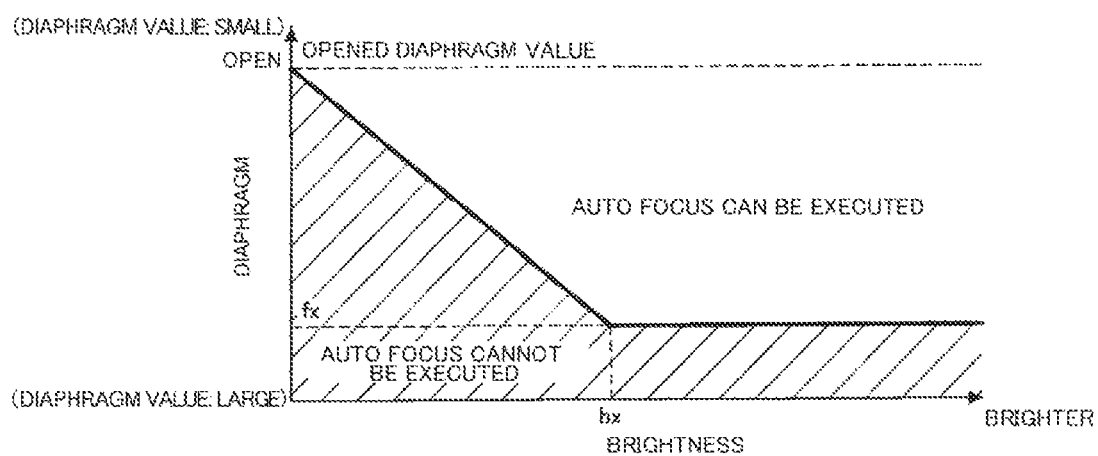
FIG. 3 is an example of a line graph depicting a relationship between a maximum value of a diaphragm value with which auto focus can be executed and brightness of an imaging target.

FIG. 3 is an example of the line graph depicting a relationship between a maximum value of a diaphragm value with which autofocus can be executed and brightness of an imaging target. As illustrated in FIG. 3, the maximum value of the diaphragm value with which auto focus can be executed is larger as the imaging target is brighter. However, when the brightness is bx or more, the maximum value of the diaphragm value with which auto focus can be executed becomes a constant diaphragm value fx. The diaphragm value fx is the theoretical maximum value of the diaphragm value with which the auto focus can be executed. It should be noted that as the ordinate in FIG. 3 indicates, the aperture diameter of the diaphragm mechanism 25 is larger as the diaphragm value is smaller, and is smaller as the diaphragm value is larger.

In the auto focus in the silence priority mode, the body control unit 72 specifies a diaphragm value corresponding to the brightness of the imaging target in the diagram in FIG. 3 (hereafter tentative diaphragm value), and in a case where a diaphragm value of the diaphragm mechanism 25 determined during imaging (hereafter actual diaphragm) is not greater than the tentative diaphragm value, the body control unit 72 maintains this diaphragm value. In a case where the actual diaphragm is greater than the tentative diaphragm value, on the other hand, the body control unit 72 changes the diaphragm value of the diaphragm mechanism 25. In other words, in the auto focus of the silence priority mode, an execution condition of the diaphragm driving is that the actual diaphragm is greater than the tentative diaphragm value. It should be noted that in the performance priority mode, the body control unit 72 normally causes the interchangeable lens 10 to set the diaphragm mechanism 25 to the open state regardless the relationship between the actual diaphragm and tentative diaphragm value. The above mentioned execution condition of the diaphragm driving will be summarized with reference to FIG. 4.

Figure 4:
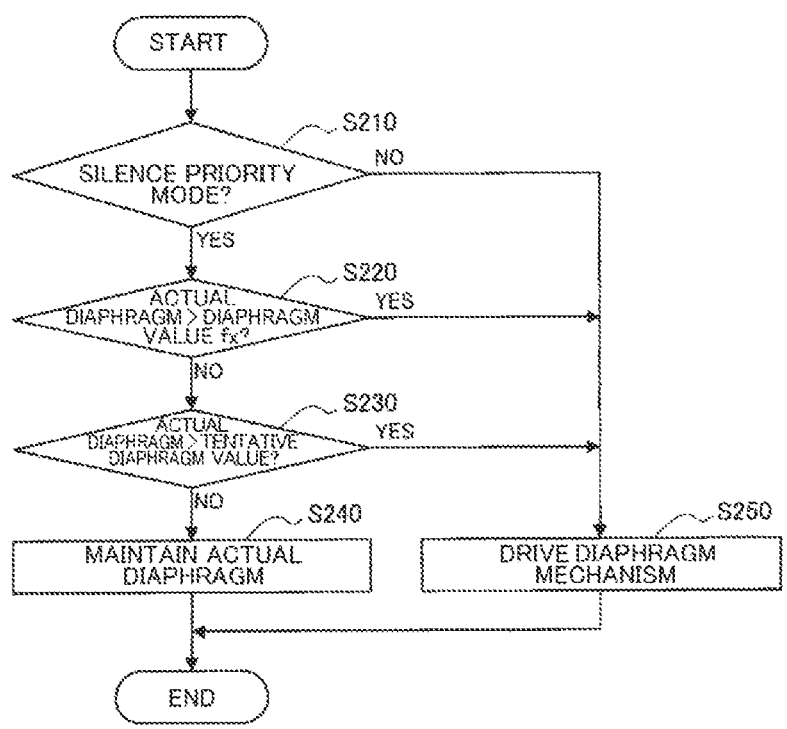
FIG. 4 is a flow chart depicting a flow of control in accordance with the execution condition of the diaphragm driving.

FIG. 4 is a flow chart depicting a flow of control in accordance with the execution condition of the diaphragm driving. As indicated in FIG. 4, the body control unit 72 determines for auto focus whether the currently set diaphragm driving mode is the silence priority mode (S210).

In the case where the currently set diaphragm driving mode is the silence priority mode (S210/Yes), the body control unit 72 determines whether the actual diaphragm exceeds the diaphragm value fx described with reference to FIG. 3 (S220). In the case where the actual diaphragm value fx described with reference to FIG. 3 (S220/No), the body control unit 72 determines whether the actual diaphragm exceeds the tentative diaphragm value described with reference to FIG. 3 (S230).

In the case where the actual diaphragm is not greater than the tentative diaphragm value (S230/No), the body control unit 72 determines to maintain the actual diaphragm (S240). On the other hand, in the case where the currently set diaphragm driving mode is not the silence priority mode (S210/No), in the case where the actual diaphragm exceeds the diaphragm value fx (S220/Yes), or in the case where the actual diaphragm exceeds the tentative diaphragm value (S230/Yes), the body control unit 72 determines to drive the diaphragm mechanism 25 (S250).

As described above, it is more difficult to execute the diaphragm driving in the silence priority mode than in the performance priority mode. Therefore in the silence priority mode, the driving sound of the diaphragm mechanism 25 can be generated less frequently.

<5. Transition Amount of Diaphragm>

As described above, in the performance priority mode, the body control unit 72 normally measures the distance in the state of causing the interchangeable lens 10 to set the diaphragm mechanism 25 to the open state, regardless the relationship between the actual diaphragm and tentative diaphragm value. In the case where it is determined to drive the diaphragm mechanism 25, on the other hand, the body control unit 72 measures the distance with the actual diaphragm in the silence priority mode in order to reduce the transition amount of the diaphragm. For example, in a case where the actual diaphragm exceeds the tentative diaphragm value, the body control unit 72 changes the diaphragm value of the diaphragm mechanism 25 to the tentative diaphragm value. A specific example of the transition of the diaphragm will be described with reference to FIG. 5 and FIG. 6.

Figure 5:
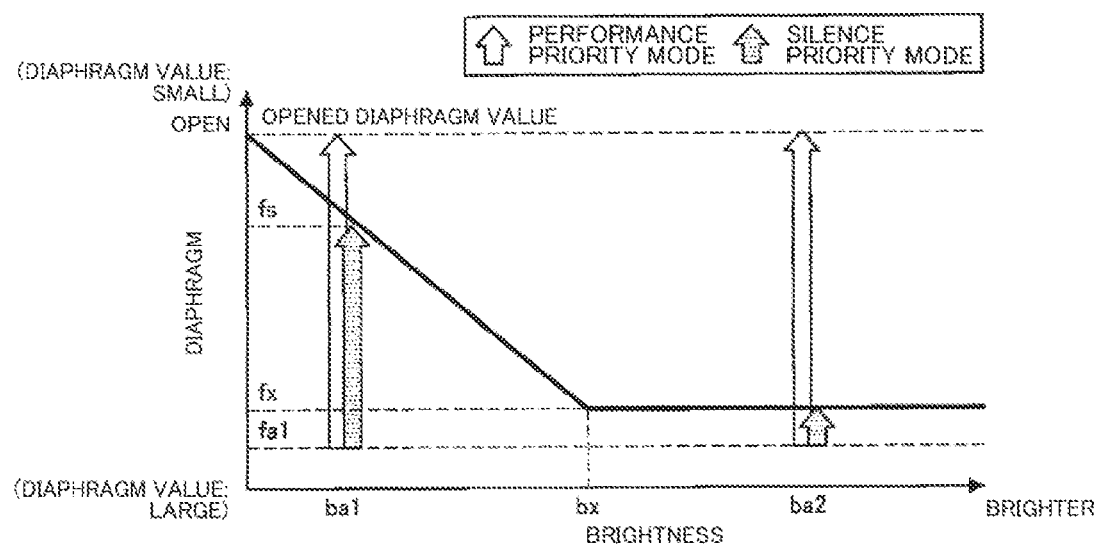
FIG. 5 is an explanatory diagram depicting a transition example of the diaphragm in a case where an actual diaphragm is a diaphragm value fa1.

FIG. 5 is an explanatory diagram depicting a transition example of the diaphragm in a case where the actual diaphragm is a diaphragm value fa1. Specifically, FIG. 5 indicates the transition of the diaphragm in the performance priority mode and silence priority mode respectively in the case where the actual diaphragm is the diaphragm value fa1 and the brightness of the imaging target is ba1 (<bx), and the transition of the diaphragm in the performance priority mode and silence priority mode respectively in the case where the actual diaphragm is the diaphragm value fa1 and the brightness of the imaging target is ba2 (>bx). The diaphragm value fa1 exceeds the diaphragm value fx which is a theoretical maximum value of the diaphragm value with which auto focus can be executed.

As indicated in FIG. 5, in the case where the actual diaphragm is the diaphragm value fa1 in the distance measurement in the performance priority mode, the body control unit 72 determines that the diaphragm value at the transition destination is the opened diaphragm value, regardless whether the brightness is ba1 or ba2. On the other hand, in the case where the actual diaphragm is the diaphragm value fa1 and the brightness is ba1 in the distance measurement in the silence priority mode, the body control unit 72 specifies a tentative diaphragm value fs based on the line graph and the brightness ba1, and determines that the diaphragm value at the transition destination is the tentative diaphragm value fs. Further, in the case where the actual diaphragm is the diaphragm value fa1 and the brightness is ba2 in the distance measurement in the silence priority mode, the body control unit 72 determines that the diaphragm value at the transition destination is the tentative diaphragm value fx. As indicated in FIG. 5, in the case where the actual diaphragm exceeds the diaphragm value fx, the transition amount of the diaphragm in the distance measurement by auto focus in the silence priority mode is reduced compared with the transition amount of the diaphragm in the distance measurement in the performance priority mode, regardless the brightness. By reducing the transition amount of the diaphragm in the distance measurement by auto focus in the silence priority mode, the driving sound of the diaphragm mechanism 25 can also be reduced.

Figure 6:
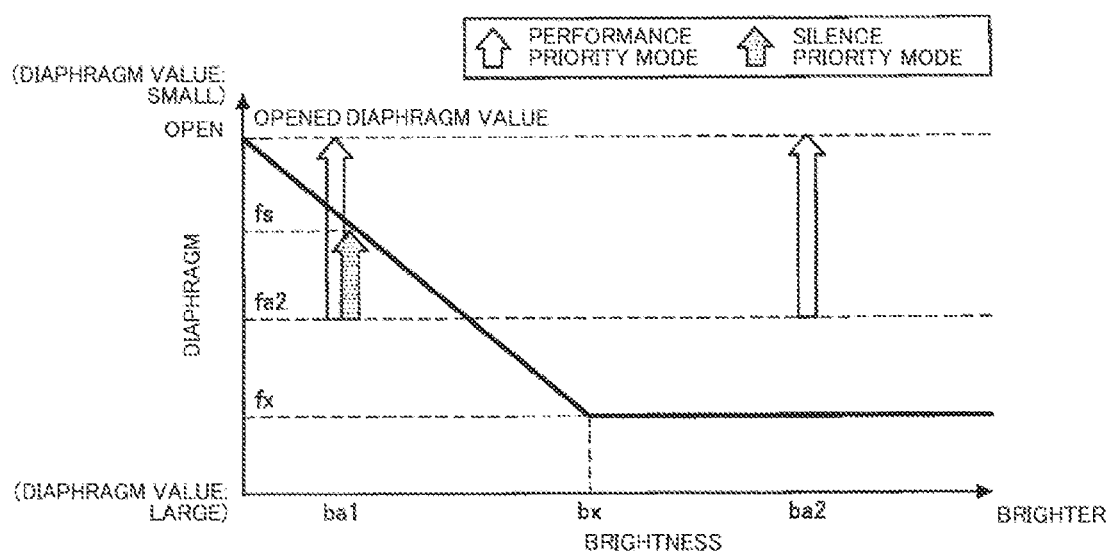
FIG. 6 is an explanatory diagram depicting a transition example of the diaphragm in a case where an actual diaphragm is a diaphragm value fa2.

FIG. 6 is an explanatory diagram depicting a transition example of the diaphragm in a case where the actual diaphragm is a diaphragm value fa2. Specifically, FIG. 6 indicates the transition of the diaphragm in the distance measurement in the performance priority mode and silence priority mode respectively, in the case where the actual diaphragm is the diaphragm value fa2 and brightness of the imaging target is ba1 (<bx); and the transition of the diaphragm in the distance measurement in the performance priority mode and silence priority mode respectively, in the case where the actual diaphragm is the diaphragm value fa2 and brightness of the imaging target is ba2 (>bx). The diaphragm value fa2 is not greater than the diaphragm value fx, which is a theoretical maximum value of the diaphragm value with which auto focus can be executed.

As indicated in FIG. 6, in the case where the actual diaphragm is the diaphragm value fa2 as well, in the distance measurement in the performance priority mode, the body control unit 72 determines that the diaphragm value at the transition destination is the opened diaphragm value regardless whether the brightness is ba1 or ba2. On the other hand, in the case where the actual diaphragm is the diaphragm value fa2 and brightness is ba1 in the distance measurement in the silence priority mode, the body control unit 72 specifies a tentative diaphragm value fs based on the line graph and brightness ba1, and determines that the diaphragm value at the transition destination is the tentative diaphragm value fs. Further, in the case where the actual diaphragm is the diaphragm value fa2 and brightness is ba2 in the distance measurement in the silence priority mode, the body control unit 72 maintains the actual diaphragm in accordance with the execution condition of the diaphragm driving described with reference to FIG. 4. As indicated in FIG. 6, in the case where the actual diaphragm is not greater than the diaphragm value fx, the transition amount of the diaphragm in the distance measurement by auto focus in the silence priority mode is reduced compared with the transition amount of the diaphragm in the performance priority mode, or becomes 0. As a result, the driving sound of the diaphragm mechanism 25 can be reduced.

<Types of Diaphragm Driving>

The types of the diaphragm driving include vertical synchronous driving and asynchronous driving. The vertical synchronous driving is driving in which the change timings of the driving speed synchronize with the vertical synchronizing signals. The asynchronous driving is driving in which the change timings of the driving speed do not synchronize with the vertical synchronizing signals. The vertical synchronous driving and asynchronous driving will now be described specifically with reference to FIG. 7.

Figure 7:
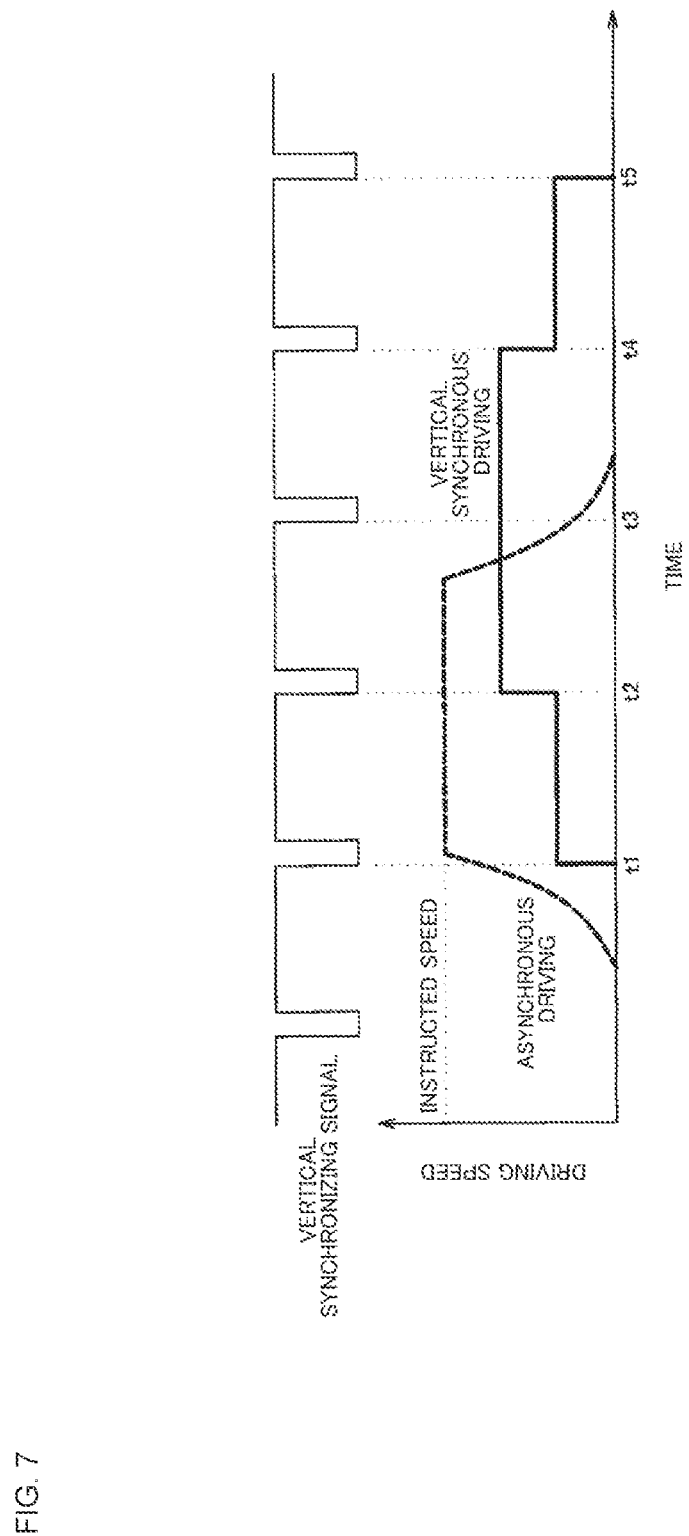
FIG. 7 is an explanatory diagram depicting vertical synchronous driving and asynchronous driving.

FIG. 7 is an explanatory diagram depicting the vertical synchronous driving and the asynchronous driving. As indicated in FIG. 7, in the vertical synchronous driving, the driving speed of the diaphragm changes only for a predetermined amount at the timings t1, t2, t4 and t5, which match the fall timings of the vertical synchronizing signals. In the asynchronous driving, on the other hand, the diaphragm driving is started at a timing that is not synchronized with the fall timing of the vertical synchronizing signal; the driving speed increases until the driving speed reaches the instructed speed which is sent from the imaging apparatus 60 to the interchangeable lens 10; the driving speed decreases after the driving at the instructed speed is maintained; and then the diaphragm driving ends at a timing that is not synchronized with the fall timing of the vertical synchronizing signal.

In the vertical synchronous driving, compared with the asynchronous driving, the change timings of the driving speed are limited to the timings that synchronize with the vertical synchronizing signals, and the change amount of the driving speed at the change timings is limited to a predetermined amount or less. Therefore in the case of the vertical synchronous driving, the driving speed does not rise to the instructed speed very easily. In the case of the asynchronous driving, on the other hand, there are no limitations on the timings and the change amount, unlike the vertical synchronous driving, hence the driving speed can rise to the instructed speed easily.

The value of the driving speed may influence the diaphragm transition time from the start of the diaphragm driving to the end of the diaphragm driving, and prolonging the diaphragm transition time may be a downside for the user. Therefore in the performance priority mode, the body control unit 72 selects the asynchronous driving so that the diaphragm transition time is not prolonged.

On the other hand, as the driving speed increases, the driving sound of the diaphragm mechanism 25 increases, and as the driving speed slows, the driving sound of the diaphragm mechanism 25 decreases. Because of this, in the vertical synchronous driving, the driving sound of the diaphragm mechanism 25 is lower than in the asynchronous driving. Therefore in the silence priority mode, the body control unit 72 may select the asynchronous driving or the vertical synchronous driving in accordance with a predetermined standard.

Figure 8:
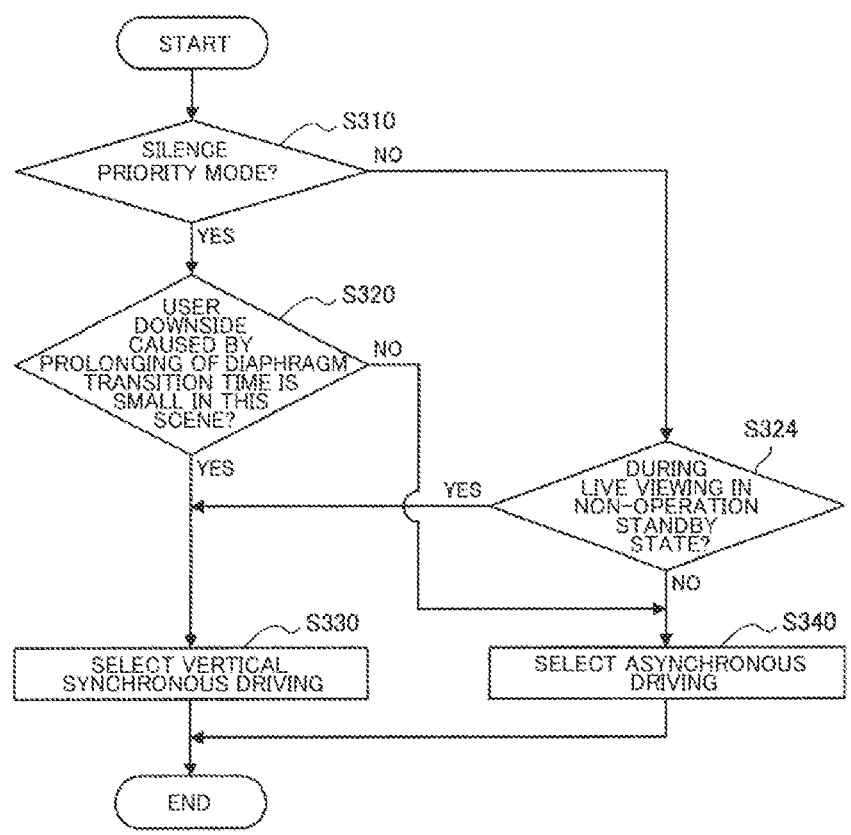
FIG. 8 is a flow chart depicting a selection standard to select a diaphragm driving type.

FIG. 8 is a flow chart depicting a selection standard to select a type of diaphragm driving. As indicated in FIG. 8, in the silence priority mode (S310/Yes), the body control unit 72 determines whether the current scene, in which the diaphragm mechanism 25 is driven, is a scene where the downside caused by prolonging the diaphragm transition time is small to the user (S320). In other words, the body control unit 72 determines whether the difference between the capturing result intended by the user and the actual capturing result is expected to be small in the scene. Specifically, the imaging apparatus 60 performs this determination in accordance with the state (mode) of the imaging apparatus 60 at the timing when the diaphragm driving instruction is sent to the interchangeable lens 10.

Examples of the scene where the downside caused by prolonging of the diaphragm transition time is small to the user are: a scene where the capturing diaphragm value is changed by the user using a dial operation; and a scene where the diaphragm value is changed to follow the automatic exposure (AE) during live view in the non-operation standby state or during consecutive shooting.

On the other hand, examples of the scene where the downside caused by prolonging of the diaphragm transition time is not small to the user are: a scene where the diaphragm value is changed for auto focus by half-depressing the release button 82a; and a scene where the diaphragm value is changed to the capturing diaphragm value by fully depressing the release button 82a.

In the case where it is determined that the current scene, in which the diaphragm mechanism 25 is driven, is a scene where the downside caused by prolonging the diaphragm transition time is small to the user (S320/Yes), the body control unit 72 selects the vertical synchronous driving (S330). In the case where the diaphragm driving mode is the performance priority mode (S310/No), on the other hand, the body control unit 72 selects the type of diaphragm driving depending on whether the current scene in which the diaphragm mechanism 25 is driven is the scene of live viewing in the non-operation standby state (S324). Specifically, the body control unit 72 selects the vertical synchronous driving in the case where the current scene in which the diaphragm mechanism 25 is driven is the scene of live viewing in the non-operation standby state (S324/Yes, S330), and selects the asynchronous driving in the case where the current scene in which the diaphragm mechanism 25 is driven is not the scene of live viewing in the non-operation standby state (S324/No, S340). Furthermore, in the case where the current scene in which the diaphragm mechanism 25 is driven in the silence priority mode is a scene where user downside caused by prolonging of the diaphragm transition time is not small to the user (S320/No) as well, the body control unit 72 selects the asynchronous driving (S340).

Figure 9:
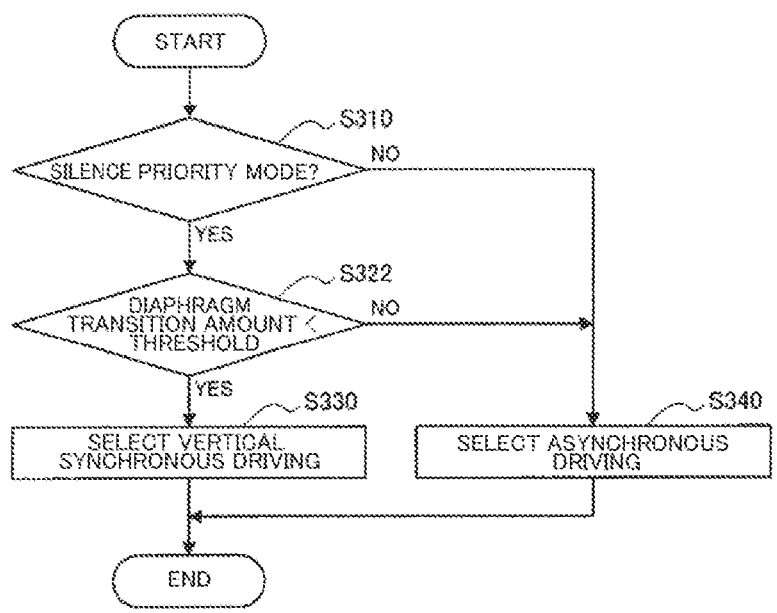
FIG. 9 is a flow chart depicting another selection standard to select a diaphragm driving type.

FIG. 9 is a flow chart depicting another selection standard to select a type of diaphragm driving. As indicated in FIG. 9, in the silence priority mode (S310/Yes), the body control unit 72 determines whether the diaphragm transition amount is less than a threshold (S322). The diaphragm transition amount is the difference between the current diaphragm value of the diaphragm mechanism 25 and the diaphragm value at the transition destination, and the diaphragm value at the transition destination is determined by the method described in "5. Transition amount of diaphragm", for example.

Here the difference of the diaphragm transition time between each type of diaphragm driving also decreases as the diaphragm transition amount is smaller. Therefore in the case where the diaphragm transition amount is less than a threshold (S322/Yes), the body control unit 72 selects the vertical synchronous driving (S330). In the case where the diaphragm transition amount is not less than the threshold (S322/No), on the other hand, the body control unit 72 selects the asynchronous driving (S340).

In the silence priority mode, the vertical synchronous driving or asynchronous driving can be selected regardless which of the selection standard described with reference to FIG. 8 and the selection standard described with reference to FIG. 9 is used, and in the case of selecting the vertical synchronous driving, the driving sound of the diaphragm mechanism 25 can be reduced.

<7. Driving Speed of Diaphragm>

As described above, the body control unit 72 can select either the vertical synchronous driving or asynchronous driving as the type of diaphragm driving. The driving speed of the diaphragm and the driving sound of the diaphragm mechanism 25 change depending on which of the vertical synchronous driving and asynchronous driving is selected. Furthermore, the body control unit 72 may notify the diaphragm driving mode and the type of diaphragm driving to the interchangeable lens 10, and the lens control unit 22 of the interchangeable lens 10 may change the driving speed of the diaphragm in according with the diaphragm driving mode, even if the type of diaphragm driving is the same. A specific example of the driving speed of the diaphragm will be described with reference to FIG. 10.

Figure 10:
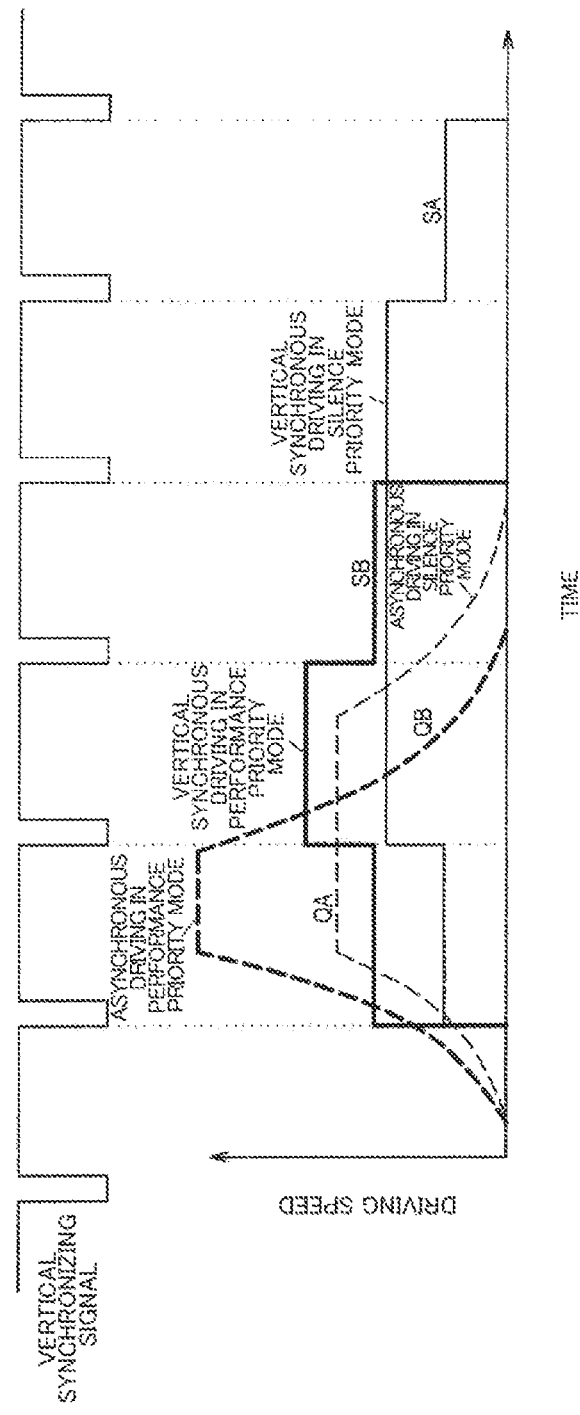
FIG. 10 is an explanatory diagram depicting a specific example of driving speed of a diaphragm.

FIG. 10 is an explanatory diagram depicting a specific example of the driving speed of a diaphragm. In FIG. 10, a change of the driving speed in accordance with the combination of the diaphragm driving mode and the type of diaphragm driving is indicated for the same transition amount of the diaphragm. Specifically, a line SA indicates the change of the driving speed when the silence priority mode and the vertical synchronous driving are combined, a line SB indicates the change of the driving speed when the performance priority mode and the vertical synchronous driving are combined, a line QA indicates the change of the driving speed when the silence priority mode and the asynchronous driving are combined, and a line QB indicates the change of the driving speed when the performance priority mode and the asynchronous driving are combined.

As the lines SA and SB indicate, in the case where the type of diaphragm driving is the vertical synchronous driving, the lens control unit 22 of the interchangeable lens 10 limits the maximum speed of the driving speed more in the silence priority mode than in the performance priority mode. In the same manner, as the lines QA and QB indicate, in the case where the type of diaphragm driving is the asynchronous driving, the lens control unit 22 of the interchangeable lens 10 limits the maximum speed of the driving speed in the silence priority mode more than in the performance priority mode.

By this configuration, in the silence priority mode, the driving sound of the diaphragm mechanism 25 can be further reduced regardless the type of the diaphragm driving.

<8. Summary of Operation>

The structure to reduce the driving sound of the diaphragm mechanism 25 in the camera system 1 according to the embodiment of the present disclosure was described above. Now the operation of the camera system 1 according to the embodiment of the present disclosure will be summarized with reference to FIG. 11A and FIG. 11B.

Figure 11A:
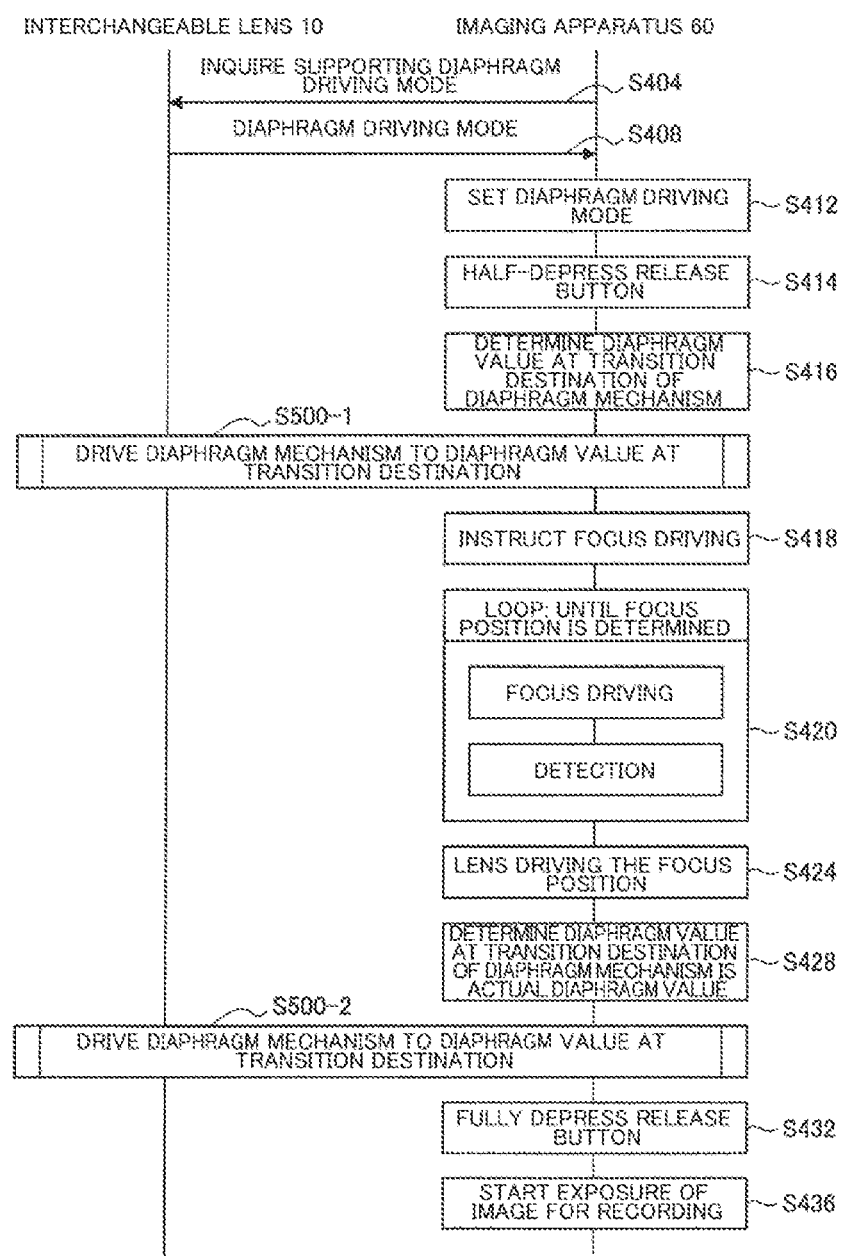
FIG. 11A is an explanatory diagram depicting an operation of the camera system 1 according to the embodiment of the present disclosure.

FIG. 11A is an explanatory diagram depicting an operation of the camera system 1 according to the embodiment of the present disclosure. First in the case where the interchangeable lens 10 is attached to the imaging apparatus 60, or in the case where the power of the imaging apparatus 60 is turned ON, for example, the imaging apparatus 60 inquires as indicated in FIG. 11A, via the mount unit 71, what diaphragm driving mode is supported by the interchangeable lens 10 (S404). Responding to this inquiry, the interchangeable lens 10 transmits, via the mount unit 21, the information indicating the diaphragm driving mode that is supported by the interchangeable lens 10, to the imaging apparatus 60 (S408).

In the case where the interchangeable lens 10 can support the silence priority mode, the body control unit 72 sets a diaphragm driving mode specified by the user, out of a plurality of diaphragm driving modes that include the silence priority mode (S412).

When the release button 82a is half-depressed thereafter (S414), the body control unit 72 determines the diaphragm value at the transition destination of the diaphragm mechanism 25 (S416). Here in the silence priority mode, the actual diaphragm may be maintained in some cases, as described with reference to FIG. 4. Then processing for driving the diaphragm mechanism 25 is performed between the imaging apparatus 60 and the interchangeable lens 10 (S500-1). This processing will be described later with reference to FIG. 11B.

After the diaphragm mechanism 25 is driven, the body control unit 72 instructs focus driving (S418), and the focus driving and detection are repeated until the focus position is determined (S420). Then the body control unit 72 controls the lens driving to the determined focus position (S424), and determines that the diaphragm value at the transition destination of the diaphragm mechanism 25 is the actual diaphragm value (S428). Then the processing for driving the diaphragm mechanism 25 is performed between the imaging apparatus 60 and the interchangeable lens 10 (S500-2). When the release button 82a is fully depressed thereafter (S432), exposure of an image for recording starts (S436).

Figure 11B:
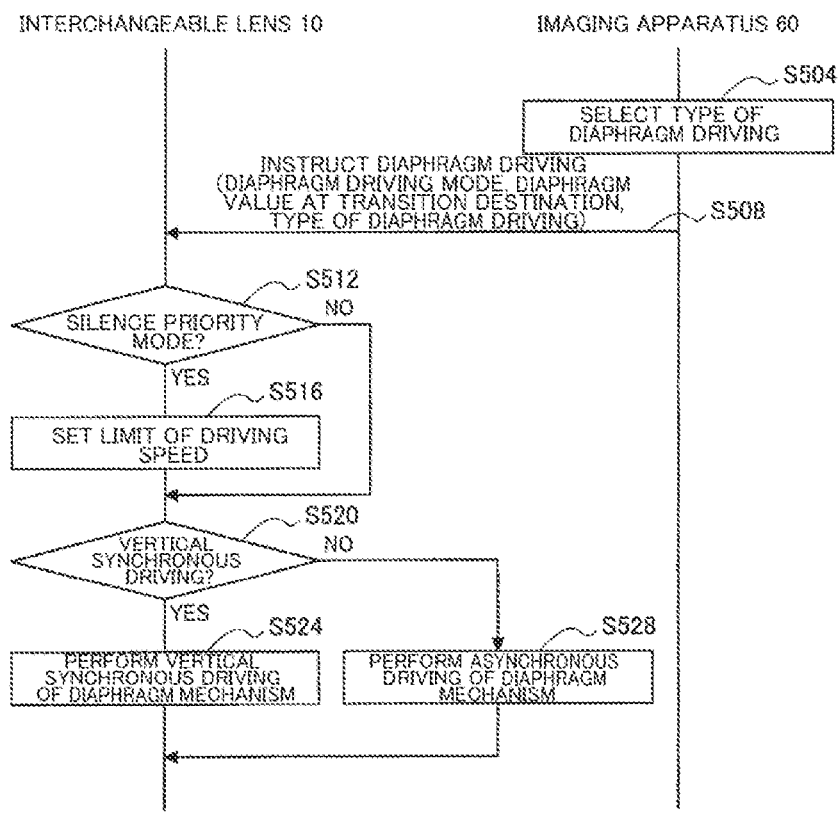
FIG. 11B is an explanatory diagram depicting processing for driving the diaphragm mechanism.

FIG. 11B is an explanatory diagram depicting a processing for driving the diaphragm mechanism 25. As indicated in FIG. 11B, first the body control unit 72 selects a type of the diaphragm driving in accordance with the selection standard described with reference to FIG. 8 or FIG. 9 (S504). Then the imaging apparatus 60 sends the diaphragm driving instruction to the interchangeable lens 10 (S508). The diaphragm driving instruction includes the diaphragm driving mode that was set in S412, the diaphragm value at the transition destination that was determined in S416, and the parameter that indicates the type of the diaphragm driving selected in S504. In the case where the diaphragm driving instruction includes a parameter that indicates the silence priority mode (S512/Yes), the lens control unit 22 of the interchangeable lens 10 sets the limit of the driving speed of the diaphragm (S516). In the case where the diaphragm driving instruction includes a parameter that indicates the vertical synchronous driving (S520/Yes), the lens control unit 22 causes the diaphragm driving unit 46 to execute the vertical synchronous driving so that the diaphragm value of the diaphragm mechanism 25 becomes a diaphragm value at the transition destination indicated by the parameter that is included in the diaphragm driving instruction (S524). On the other hand, in the case where the diaphragm driving instruction includes a parameter that indicates the asynchronous driving (S520/No), the lens control unit 22 causes the diaphragm driving unit 46 to execute the asynchronous driving so that the diaphragm value of the diaphragm mechanism 25 becomes a diaphragm value at the transition destination indicated by the parameter that is included in the diaphragm driving instruction (S528).

<9. Summary of Functional Effects>

According to the embodiment of the present disclosure described above, various functional effects are implemented. For example, in the silence priority mode, the condition to limit the execution of the diaphragm driving is applied, hence the diaphragm driving is not executed easily in the silence priority mode. In other words, in the silence priority mode, generation of the driving sound of the diaphragm mechanism 25 can be generated less frequently.

Further, in the distance measurement by auto focus in the performance priority mode, the body control unit 72 normally causes the interchangeable lens 10 to set the diaphragm mechanism 25 to the open state, regardless the relationship between the actual diaphragm and the tentative diaphragm value. In the silence priority mode, on the other hand, the body control unit 72 reduces the transition amount of the diaphragm. For example, in the case where the actual diaphragm exceeds the tentative diaphragm value, the body control unit 72 changes the diaphragm value of the diaphragm mechanism 25 to the tentative diaphragm value. By this configuration, the transition amount of the diaphragm in the distance measurement by auto focus in the silence priority mode can be less than the transition amount of the diaphragm in the performance priority mode, or be reduced to 0. As a result, the driving sound of the diaphragm mechanism 25 can be reduced.

Also in the silence priority mode, the vertical synchronous driving or the asynchronous driving can be appropriately selected, and in the case of selecting the vertical synchronous driving, the driving sound of the diaphragm mechanism 25 can be reduced.

Furthermore, the lens control unit 22 of the interchangeable lens 10 sets the limit of the driving speed in the silence priority mode regardless the type of the diaphragm driving. By this configuration, in the silence priority mode, the driving sound of the diaphragm mechanism 25 can be further reduced regardless the type of the diaphragm driving.

<10. Modifications>

The performance priority mode and the silence priority mode have been described as the types of the diaphragm driving modes. However, the types of the diaphragm driving modes are not limited to the two modes: the silence priority mode and the performance priority mode, but may be three or more diaphragm driving modes. For example, in addition to the silence priority mode and the performance priority mode, a balance mode may be provided as the third diaphragm driving mode, in which the driving sound of the diaphragm mechanism 25 is less than that in the performance priority mode, and the performance of the camera system 1 is better than that in the silence priority mode. A specific example of the balance mode will now be described.

Figure 12:
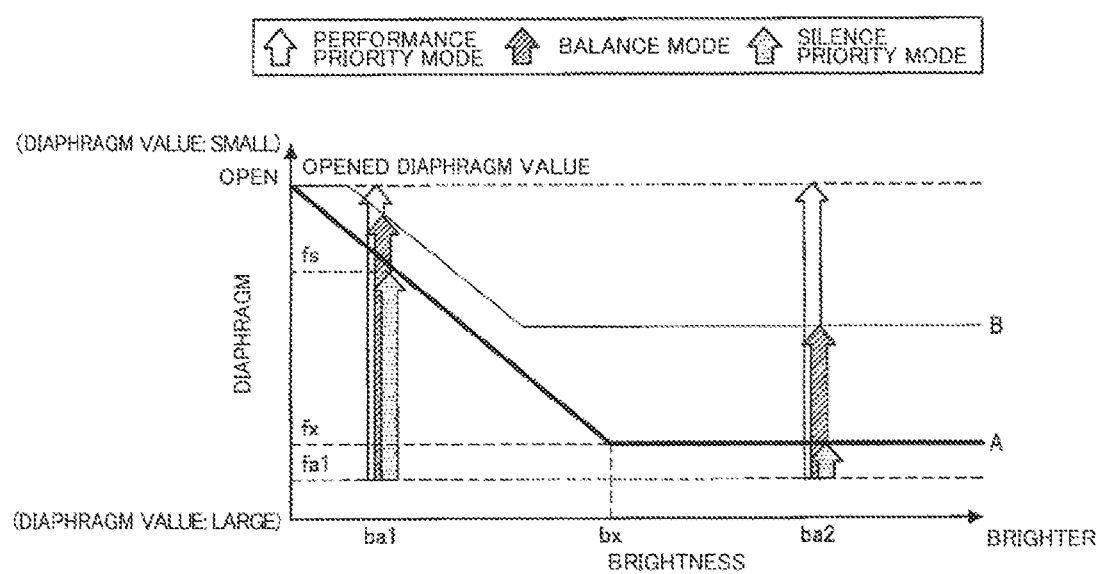
FIG. 12 is an explanatory diagram depicting transition of the diaphragm according to a modification.

FIG. 12 is an explanatory diagram depicting the transition of the diaphragm according to a modification. In FIG. 12, the line graph A is the line graph described with reference to FIG. 3, and is a line graph used for diaphragm driving in the silence priority mode. The line graph B is the line graph used for the diaphragm driving in the balance mode.

As indicated in FIG. 12, the line graph B is located on the opened diaphragm value side of the line graph A at each brightness. Therefore in the case of the distance measurement in the balance mode, the transition amount of the diaphragm is larger than in the silence priority mode at each brightness, but the transition amount of the diaphragm is smaller than in the performance priority mode. Therefore in the case of the distance measurement in the balance mode, the driving sound of the diaphragm mechanism 25 can be less than that in the performance priority mode, and the performance of the camera system 1 can be better than that in the silence priority mode.

Further, in the case of the distance measurement in the balance mode, the driving speed of the diaphragm mechanism 25 may be faster than the driving speed in the silence priority mode, and slower than the driving speed in the performance priority mode. By this configuration, in the distance measurement in the balance mode, the driving sound of the diaphragm mechanism 25 can be less than that in the performance priority mode, and the release time lag can be shorter than that in the silence priority mode.

<11. Supplements>

While the preferred embodiment of the present disclosure has been described in detail with reference to the accompanying drawings, the technical scope of the present disclosure is not limited to this examples. It should be understood that various modifications and alterations may be implemented by those skilled in the art of the present disclosure within the scope of the technical concept of the appended claims, and these modifications and alterations are certainly included in the technical scope of the disclosure.

For example, each step of the processing by the camera system 1 of the present description need not be processed in a time series in accordance with the sequence in the sequence diagram or in the flow chart. For example, each step of the processing by the camera system 1 may be processed in a sequence that is different from the sequence indicated in the flow chart, or may be processed in parallel.

Further, a computer program, to cause such hardware as the CPU, ROM and RAM included in the interchangeable lens 10 or the imaging apparatus 60 to perform the functions equivalent to the above mentioned functions of each configuration of the interchangeable lens 10 or the imaging apparatus 60, may be written. A storage medium storing this computer program may also be provided.

The effects stated in the present description are merely explanatory or exemplary, and are not restrictive. In other words, the technique according to the present disclosure may exhibit other effects that are clear to those skilled in the art based on the contents of the present description, along with the above mentioned effects or instead of the above mentioned effects.

The following configuration is also within a technical scope of the present disclosure.

(1)

An imaging apparatus including:

a mode setting unit configured to set one diaphragm driving mode out of a plurality of diaphragm driving modes including a first diaphragm driving mode and a second diaphragm driving mode in which diaphragm driving is more limited than in the first diaphragm driving mode; and a diaphragm control unit configured to control diaphragm driving in accordance with brightness of an imaging target in a case where the mode setting unit sets the second diaphragm driving mode.

(2)

The imaging apparatus according to the above (1), wherein, in the second diaphragm driving mode, the diaphragm control unit specifies a tentative diaphragm value in accordance with the brightness of an imaging target, changes the diaphragm value of the diaphragm mechanism to the tentative diaphragm value in a case where the diaphragm value of the diaphragm mechanism is greater than the tentative diaphragm value, and maintains the diaphragm value of the diaphragm mechanism in a case where the diaphragm value of the diaphragm mechanism is not greater than the tentative diaphragm value.

(3)

The imaging apparatus according to the above (2), wherein an aperture diameter of the diaphragm mechanism is larger as the diaphragm value is smaller, and is smaller as the diaphragm value is greater.

(4)

The imaging apparatus according to any one of the above (1) to (3), wherein in the second diaphragm driving mode, the maximum speed of the diaphragm driving is more limited than in the first diaphragm driving mode.

(5)

The imaging apparatus according to any one of the above (1) to (4), wherein, in the second diaphragm driving mode, the diaphragm control unit controls the diaphragm driving by asynchronous driving in which change timings of the driving speed do not synchronize with vertical synchronizing signals, or vertical synchronous driving in which change timings of the driving speed synchronize with the vertical synchronizing signals.

(6)

The imaging apparatus according to the above (5), wherein, in the second diaphragm driving mode, the diaphragm control unit selects the asynchronous driving or the vertical synchronous driving in accordance with a scene in which the diaphragm mechanism is driven.

(7)

The imaging apparatus according to the above (5), wherein in the second diaphragm driving mode, the diaphragm control unit selects the vertical synchronous driving in a case where the difference between a diaphragm value of the diaphragm mechanism and a diaphragm value at a transition destination by the diaphragm driving is less than a threshold, and selects the asynchronous driving in a case where the difference is not less than the threshold.

(8)

The imaging apparatus according to any one of the above (1) to (7), further including an operation unit for a user to specify a diaphragm driving mode, wherein the mode setting unit sets a diaphragm driving mode specified by the user using the operation unit.

(9)

The imaging apparatus according to any one of the above (1) to (7), further including a scene estimation unit configured to estimate a scene, wherein the mode setting unit sets a diaphragm driving mode in accordance with a scene estimated by the scene estimation unit.

(10)

The imaging apparatus according to any one of the above (1) to (9), wherein the diaphragm control unit controls the diaphragm driving by determining parameters for the diaphragm driving, and the imaging apparatus further includes a communication unit configured to supply the parameters to an interchangeable lens attached to the imaging apparatus.

(11)

The imaging apparatus according to the above (10), wherein the communication unit receives, from the interchangeable lens, information indicating a diaphragm driving mode that the interchangeable lens can support, and in a case where the interchangeable lens supports the second diaphragm driving mode, the mode setting unit sets a diaphragm driving mode out of a plurality of diaphragm driving modes including the second diaphragm driving mode.

(12)

The imaging apparatus according to any one of the above (1) to (9), further including:

a diaphragm mechanism; and a diaphragm driving unit configured to drive the diaphragm mechanism in accordance with the control by the diaphragm control unit.

(13)

The imaging apparatus according to any one of the above (1) to (12), wherein the diaphragm driving is diaphragm driving that is performed when auto focus is executed.

(14)

The imaging apparatus according to the above (13), wherein auto focus is single auto focus, and in the single auto focus in the first diaphragm driving mode, the diaphragm control unit opens the aperture diameter of the diaphragm mechanism to the maximum for distance measurement.

(15)

An imaging control method including steps of:

setting one diaphragm driving mode out of a plurality of diaphragm driving modes including a first diaphragm driving mode and a second diaphragm driving mode in which diaphragm driving is more limited than in the first diaphragm driving mode; and controlling diaphragm driving using a processor in accordance with brightness of an imaging target in a case where the second diaphragm driving mode is set.

(16)

An interchangeable lens including:

a diaphragm mechanism;

a communication unit to which parameters indicating one diaphragm driving mode, out of a plurality of diaphragm driving modes including a first diaphragm driving mode and a second diaphragm driving mode, and a diaphragm value, are supplied; and a diaphragm driving unit configured to drive the diaphragm mechanism such that an aperture diameter of the diaphragm mechanism becomes an aperture diameter corresponding to the diaphragm value, wherein, in the second diaphragm driving mode, the diaphragm driving unit drives the diaphragm mechanism at a lower speed than in the first diaphragm driving mode.

(17)

The interchangeable lens according to the above (16), wherein in the first diaphragm driving mode, the diaphragm driving unit drives the diaphragm mechanism by asynchronous driving in which change timings of the driving speed do not synchronize with vertical synchronizing signals, and in the second diaphragm driving mode, the diaphragm driving unit drives the diaphragm mechanism by the asynchronous driving or the vertical synchronous driving with the vertical synchronizing signals.

(18)

The interchangeable lens according to the above (16) or (17), wherein the communication unit supplies information indicating that the interchangeable lens can support the second diaphragm driving mode to the imaging apparatus.

(19)

A diaphragm driving method using an interchangeable lens, including steps of:

supplying parameters indicating one diaphragm driving mode out of a plurality of diaphragm driving modes including a first diaphragm driving mode and a second diaphragm driving mode, and a diaphragm value; and driving the diaphragm mechanism so that an aperture diameter of a diaphragm mechanism becomes an aperture diameter corresponding to the diaphragm value, wherein, in the second diaphragm driving mode, driving the diaphragm mechanism includes driving the diaphragm mechanism at lower speed than in the first diaphragm driving mode.

REFERENCE SIGNS LIST

1 Camera system
10 Interchangeable lens
21 Mount unit
22 Lens control unit
23 Zoom lens
24 Correction lens
25 Diaphragm mechanism
26 Object side focus lens
27 Element side focus lens
28 Operation unit
29 Memory unit
30 Recording unit
31 Power supply control unit
32 Temperature sensor
41 Zoom position detection unit
42 Zoom driving unit
43 Camera shake detection unit
44 Camera shake driving unit
45 Diaphragm detection unit
46 Diaphragm driving unit
47 Object side lens position detection unit
48 Object side lens driving unit
49 Element side lens position detection unit
50 Element side lens driving unit
60 Imaging apparatus
71 Mount unit
72 Body control unit
73 Mechanism shutter
74 Shutter detection unit
75 Shutter driving unit
76 Image pickup element
77 Image signal processing unit
78 Recording unit
79 Display unit
80 Power supply control unit
81 Power supply unit
82 Operation unit
82a Release button
83 Sound collection unit

The invention claimed is:

1. An imaging apparatus, comprising:
a mode setting unit configured to set a diaphragm driving mode from a plurality of diaphragm driving modes, wherein
the plurality of diaphragm driving modes includes a first diaphragm driving mode and a second diaphragm driving mode, and
in the second diaphragm driving mode, a transition amount of a diaphragm mechanism for a diaphragm driving operation is less than the transition amount of the diaphragm mechanism in the first diaphragm driving mode; and
a diaphragm control unit configured to control the diaphragm driving operation in accordance with a brightness of an imaging target in a case where the diaphragm driving mode is the second diaphragm driving mode.

2. The imaging apparatus according to claim 1, wherein, in the second diaphragm driving mode, the diaphragm control unit is further configured to:
specify a tentative diaphragm value in accordance with the brightness of the imaging target;
change a diaphragm value of the diaphragm mechanism to the tentative diaphragm value in a case where the diaphragm value of the diaphragm mechanism is greater than the tentative diaphragm value; and
maintain the diaphragm value of the diaphragm mechanism in a case where the diaphragm value of the diaphragm mechanism is not greater than the tentative diaphragm value.

3. The imaging apparatus according to claim 2, wherein an aperture diameter of the diaphragm mechanism is larger as the diaphragm value is smaller, and
the aperture diameter of the diaphragm mechanism is smaller as the diaphragm value is greater.

4. The imaging apparatus according to claim 1, wherein, in the second diaphragm driving mode, a maximum speed of the diaphragm driving operation is limited than the maximum speed of the diaphragm driving operation in the first diaphragm driving mode.

5. The imaging apparatus according to claim 1, wherein, in the second diaphragm driving mode, the diaphragm control unit is further configured to control the diaphragm driving operation by one of asynchronous driving in which change timings of driving speed of the diaphragm mechanism do not synchronize with vertical synchronizing signals, or vertical synchronous driving in which the change timings of the driving speed synchronize with the vertical synchronizing signals.

6. The imaging apparatus according to claim 5, wherein, in the second diaphragm driving mode, the diaphragm control unit is further configured to select one of the asynchronous driving or the vertical synchronous driving in accordance with a scene in which the diaphragm mechanism is driven.

7. The imaging apparatus according to claim 5, wherein, in the second diaphragm driving mode, the diaphragm control unit is further configured to:
   select the vertical synchronous driving in a case where a difference between a current diaphragm value of the diaphragm mechanism and a diaphragm value at a transition destination by the diaphragm driving operation is less than a threshold; and
   select the asynchronous driving in a case where the difference is not less than the threshold.

8. The imaging apparatus according to claim 1, further comprising an operation unit configured to specify the diaphragm driving mode, wherein
   the operation unit is operable by a user, and
   the mode setting unit is further configured to set the diaphragm driving mode that is specified using the operation unit.

9. The imaging apparatus according to claim 1, further comprising a scene estimation unit configured to estimate a scene, wherein
   the mode setting unit is configured to set the diaphragm driving mode in accordance with the estimated scene.

10. The imaging apparatus according to claim 1, wherein the diaphragm control unit is further configured to:
    determine parameters for the diaphragm driving operation; and
    control the diaphragm driving operation based on the determined parameters, and
    the imaging apparatus further comprises a communication unit configured to supply the parameters to an interchangeable lens attached to the imaging apparatus.

11. The imaging apparatus according to claim 10, wherein the communication unit is configured to receive, from the interchangeable lens, information indicating the diaphragm driving mode supported by the interchangeable lens, and
    in the case where the interchangeable lens supports the second diaphragm driving mode, the mode setting unit is further configured to set the diaphragm driving mode from the plurality of diaphragm driving modes.

12. The imaging apparatus according to claim 1, further comprising:
    the diaphragm mechanism; and
    a diaphragm driving unit configured to drive the diaphragm mechanism in accordance with the control by the diaphragm control unit.

13. The imaging apparatus according to claim 1, wherein the diaphragm driving operation is for execution of auto focus.

14. The imaging apparatus according to claim 13, wherein the auto focus is single auto focus, and
    in the single auto focus in the first diaphragm driving mode, the diaphragm control unit is further configured to open an aperture diameter of the diaphragm mechanism to a maximum for distance measurement.

15. An imaging control method, comprising:
    setting a diaphragm driving mode from a plurality of diaphragm driving modes, wherein
       the plurality of diaphragm driving modes includes a first diaphragm driving mode and a second diaphragm driving mode, and
       in the second diaphragm driving mode, a transition amount of a diaphragm mechanism for a diaphragm driving operation is less than the transition amount of the diaphragm mechanism in the first diaphragm driving mode; and
    controlling, by a processor, the diaphragm driving operation in accordance with a brightness of an imaging target in a case where the second diaphragm driving mode is set.

16. An interchangeable lens, comprising:
    a diaphragm mechanism;
    a communication unit configured to:
       receive parameters indicating a diaphragm driving mode of a plurality of diaphragm driving modes, where the plurality of diaphragm driving modes includes a first diaphragm driving mode and a second diaphragm driving mode; and
       receive a diaphragm value; and
    a diaphragm driving unit configured to drive the diaphragm mechanism such that an aperture diameter of the diaphragm mechanism becomes the aperture diameter corresponding to the diaphragm value, wherein
    in the first diaphragm driving mode, the diaphragm driving unit is further configured to drive the diaphragm mechanism by asynchronous driving in which change timings of driving speed of the diaphragm mechanism do not synchronize with vertical synchronizing signals, and
    in the second diaphragm driving mode, the diaphragm driving unit is further configured to:
       drive the diaphragm mechanism at a lower speed than in the first diaphragm driving mode; and
       drive the diaphragm mechanism by one of the asynchronous driving, or a vertical synchronous driving in which the change timings of the driving speed synchronize with the vertical synchronizing signals.

17. The interchangeable lens according to claim 16, wherein the communication unit is configured to supply information indicating that the interchangeable lens supports the second diaphragm driving mode to an imaging apparatus.

18. A diaphragm driving method using an interchangeable lens, the diaphragm driving method comprising:
    receiving parameters indicating a diaphragm driving mode of a plurality of diaphragm driving modes, wherein the plurality of diaphragm driving modes includes a first diaphragm driving mode and a second diaphragm driving mode; and
    receiving a diaphragm value; and
    driving a diaphragm mechanism such that an aperture diameter of the diaphragm mechanism becomes the aperture diameter corresponding to the diaphragm value, wherein
    in the first diaphragm driving mode, the diaphragm mechanism is driven by asynchronous driving in which change timings of driving speed of the diaphragm mechanism do not synchronize with vertical synchronizing signals, and
    in the second diaphragm driving mode:
       the diaphragm mechanism is driven at a lower speed than in the first diaphragm driving mode, and
       the diaphragm mechanism is driven by one of the asynchronous driving, or a vertical synchronous driving in which the change timings of the driving speed synchronize with the vertical synchronizing signals.

* * * * *